(12) United States Patent
Kind et al.

(10) Patent No.: US 7,792,959 B2
(45) Date of Patent: Sep. 7, 2010

(54) SYSTEMS, METHODS AND COMPUTER PROGRAM PRODUCTS FOR EXTRACTING PORT-LEVEL INFORMATION OF WEB SERVICES WITH FLOW-BASED NETWORK MONITORING

(75) Inventors: Andreas Kind, Kilchberg (CH); Marc P. Stoecklin, Basel (CH); Olaf W. Zimmermann, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 11/971,652

(22) Filed: Jan. 9, 2008

(65) Prior Publication Data

US 2009/0177768 A1 Jul. 9, 2009

(51) Int. Cl.
*G06F 15/173* (2006.01)
*G06F 15/16* (2006.01)

(52) U.S. Cl. .................. 709/224; 709/226; 709/227; 709/228

(58) Field of Classification Search ................. None
See application file for complete search history.

(56) References Cited

U.S. PATENT DOCUMENTS

| | | | |
|---|---|---|---|
| 5,774,668 A * | 6/1998 | Choquier et al. ............. 709/223 |
| 6,449,650 B1 * | 9/2002 | Westfall et al. ............. 709/228 |
| 7,290,283 B2 * | 10/2007 | Copeland, III ............... 726/25 |
| 2002/0032766 A1 * | 3/2002 | Xu ............................ 709/223 |
| 2002/0075809 A1 | 6/2002 | Phaal |
| 2006/0209794 A1 * | 9/2006 | Bae et al. .................... 370/352 |
| 2007/0011317 A1 | 1/2007 | Brandyburg et al. |
| 2007/0192863 A1 * | 8/2007 | Kapoor et al. ................ 726/23 |
| 2007/0201359 A1 | 8/2007 | Matsubara et al. |
| 2008/0016115 A1 * | 1/2008 | Bahl et al. ............... 707/104.1 |

* cited by examiner

*Primary Examiner*—Thu Nguyen
*Assistant Examiner*—Angela Widhalm
(74) *Attorney, Agent, or Firm*—Cantor Colburn LLP; Stephen Kaufman

(57) ABSTRACT

Systems, methods, and computer program products for extracting port-level information of Web services with flow-based network monitoring. Exemplary embodiments include a method for extracting port-level information of Web services with flow-based network monitoring, the method including identifying a registry machine, coupling the registry machine to a traffic meter and flow monitor dynamically configuring the traffic meter, including exporting a first n bytes of a traffic payload exporting a sub-second traffic flow start and end times, extracting service provider information from traffic flow exports, including analyzing the exported n bytes of the traffic payload to extract port-level information at the flow monitor, extracting a value of an access point element, mapping a logical service provider address to a physical address and inserting the service into a Web Service Provider Registry within the flow meter, thereby populating the Web Service Provider Registry.

1 Claim, 6 Drawing Sheets

FIG. 1
Prior Art
Source and destination ports
Examples: 22001   80, 110   45007
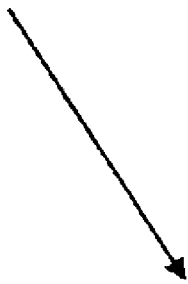
Service
   Examples: http/80, pop/110
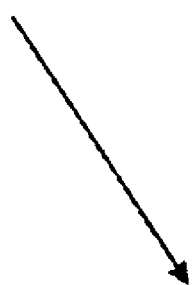
Application
   Examples: Web traffic, Mail

FIG. 3

```
HTTP/1.1 200 OK
Content-Type: text/xml;charset=utf-8
Date: Thu, 20 Sep 2007 20:42:19 GMT
Server: Apache-Coyote/1.1
Connection: close
<?xml version="1.0" encoding="utf-8"?>
<soapenv:Envelope xmlns:soapenv="http://schemas.xmlsoap.org/soap/envelope/"
xmlns:xsd="http://www.w3.org/2001/XMLSchema"
xmlns:xsi="http://www.w3.org/2001/XMLSchema-instance">
<soapenv:Body>
<serviceDetail xmlns="urn:uddi-org:api_v2">
<businessService businessKey="ABC" serviceKey="ABC">
<bindingTemplates><bindingTemplate>
<accessPoint>http://www.serviceprovider.com:8081/services/SampleWebService</accessPoint>
<tModelInstanceDetails>
<tModelInstanceInfo tModelKey="TMK"/>
</tModelInstanceDetails>
</bindingTemplate></bindingTemplates>
</businessService>
</serviceDetail>
</soapenv:Body>
</soapenv:Envelope>
```

FIG. 4

```
POST /UddiDemo/services/UddiSampleServiceProvider HTTP/1.1
Host: localhost:8081
Content-Type: text/xml; charset=utf-8
Content-Length: 347
Accept: application/soap+xml, application/dime, multipart/related, text/*
User-Agent: IBM Web Services Explorer
Cache-Control: no-cache
Pragma: no-cache
SOAPAction: "get_serviceDetail"
Connection: close
<soapenv:Envelope xmlns:soapenv="http://schemas.xmlsoap.org/soap/envelope/"
xmlns:q0="urn:uddi-org:api_v2" xmlns:xsd="http://www.w3.org/2001/XMLSchema"
xmlns:xsi="http://www.w3.org/2001/XMLSchema-instance">
<soapenv:Body>
<q0:get_serviceDetail>
<q0:serviceKey>ABC</q0:serviceKey>
</q0:get_serviceDetail>
</soapenv:Body>
</soapenv:Envelope>
```

SYSTEMS, METHODS AND COMPUTER PROGRAM PRODUCTS FOR EXTRACTING PORT-LEVEL INFORMATION OF WEB SERVICES WITH FLOW-BASED NETWORK MONITORING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

Field of the Invention

This invention relates to network monitoring, and particularly to systems, methods, and computer program products for extracting port-level information of Web services with flow-based network monitoring.

DESCRIPTION OF BACKGROUND

Network monitoring is increasingly based on flow-oriented traffic information. In this context, a key demand is to understand which applications are responsible for individual traffic flows in IT infrastructures, such as enterprise networks and data centers. A packet flow observed in an IP network can be associated with a distinct service based on the transport layer ports as provided in the flow information records. The service can then be mapped to an application. FIG. 1 illustrates prior art in determining application information from packet flows 100. Flows that are observed to use the service ports 80 and 443 are likely to use the http and https services which can be both mapped to the application termed HTTP. The application HTTP thus comprises the non-secure and secure versions of the Hypertext Transfer Protocol.

Deriving application information from transport layer ports is however only feasible if the service ports of the applications in question are statically known. In Web services architectures, services are dynamically published and registered with arbitrary transport layer ports. Instead of using static service-port mapping, dynamic service-port mapping is used. Services are typically mapped to variable ports in the range between 1024 and 65535. As the dynamic mapping cannot be known in advance, it is very difficult to assign services and applications to these traffic flows. Moreover, to circumvent restrictive firewall rules, administrators reuse well-known application service ports (e.g., 80 and 443 correspond to HTTP) in many such service-port mappings, which leads to misclassification while deriving the service and application information and to inaccurate results in accounting traffic.

Solutions to classify Web services traffic are known such as heuristics based on port ranges, static mapping using expert knowledge and query web service registries. Up to now, there exists no dominant standard for Web service registry architectures and interfaces; therefore, several query syntaxes need to be implemented in the system. A priori, it is generally not clear which API is indeed available on each registry. Furthermore, some registry APIs need security credentials for authentication, which can make passive monitoring difficult and some required information may not be visible or accessible.

SUMMARY OF THE INVENTION

Exemplary embodiments include a method for extracting port-level information of Web services with flow-based network monitoring, the method including identifying a registry machine, coupling the registry machine to a traffic meter and flow monitor, dynamically configuring the traffic meter, including exporting a first n bytes of a traffic payload and sub-second traffic flow start and end times, extracting service provider information from traffic flow exports, including analyzing the exported n bytes of the traffic payload to extract port-level information at the flow monitor, extracting a value of an access point element, mapping a logical service provider address to a physical address and inserting the service in a Web Service Provider Registry component of the flow monitor, thereby populating the Web Service Provider Registry.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which obtains the service-port mapping information with high accuracy. Due to the flow-based information acquisition method, the, approach is passive and non-intrusive, free of data queries to registries. The information is acquired from data made available by Web service core functionality itself (e.g., the PUBLISH and FIND APIs defined by UDDI). As a consequence, neither prior knowledge of available service registries to be queried nor configuration changes for involved applications are required. As opposed to network sniffing techniques capturing the entire network traffic (e.g., by port mirroring), the invention exploits existing selective flow export capabilities available at traffic meters (e.g., routers) and, thus, reduces the amount of information to be analyzed to a small fraction of the total traffic. The deployment of the systems, methods and computer program products described herein in a network is simple as most of today's routers are equipped with flow export capabilities and the new export standards are presently adopted widely in the industry.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates prior art packet flow;

FIG. 3 illustrates one example of a data structure having XML tags in accordance with exemplary embodiments;

FIG. 4 illustrates one example of a HTTP request carrying a SOAP request in accordance with exemplary embodiments;

The detailed description explains the preferred embodiments of the invention, together with advantages and features, by way of example with reference to the drawings.

DETAILED DESCRIPTION OF THE INVENTION

Exemplary embodiments include systems, methods and computer program products that address the problem of detecting Web service ports for flow-based traffic monitoring so that Web services traffic flow can be correctly classified as such. Exemplary embodiments described herein are able to classify Web service traffic between consumer and provider even if the traffic is encrypted.

The exemplary systems, methods and computer program products described herein implement passive flow-based monitoring for determining Web services transport layer ports (see FIG. 2 below). Target of the monitoring (OBSERVE) is: 1) the Web services traffic between Web service providers and Web services registries which relates to the registration of Web services (PUBLISH): and 2) the Web services traffic between Web service consumers and Web services registries which relates to locating/querying of Web services (FIND). Upcoming standards and implementations in flow-based traffic monitoring provide means for dynamic creation and adaptation of IP flow meters. Whereas in the past flow meters were configured for accounting and traffic monitoring in a static fashion, the invention can make use of the possibility to "zoom" into Web services registration (PUBLISH) and querying (FIND) traffic with the aim to extract transport port level information.

Figure 2:
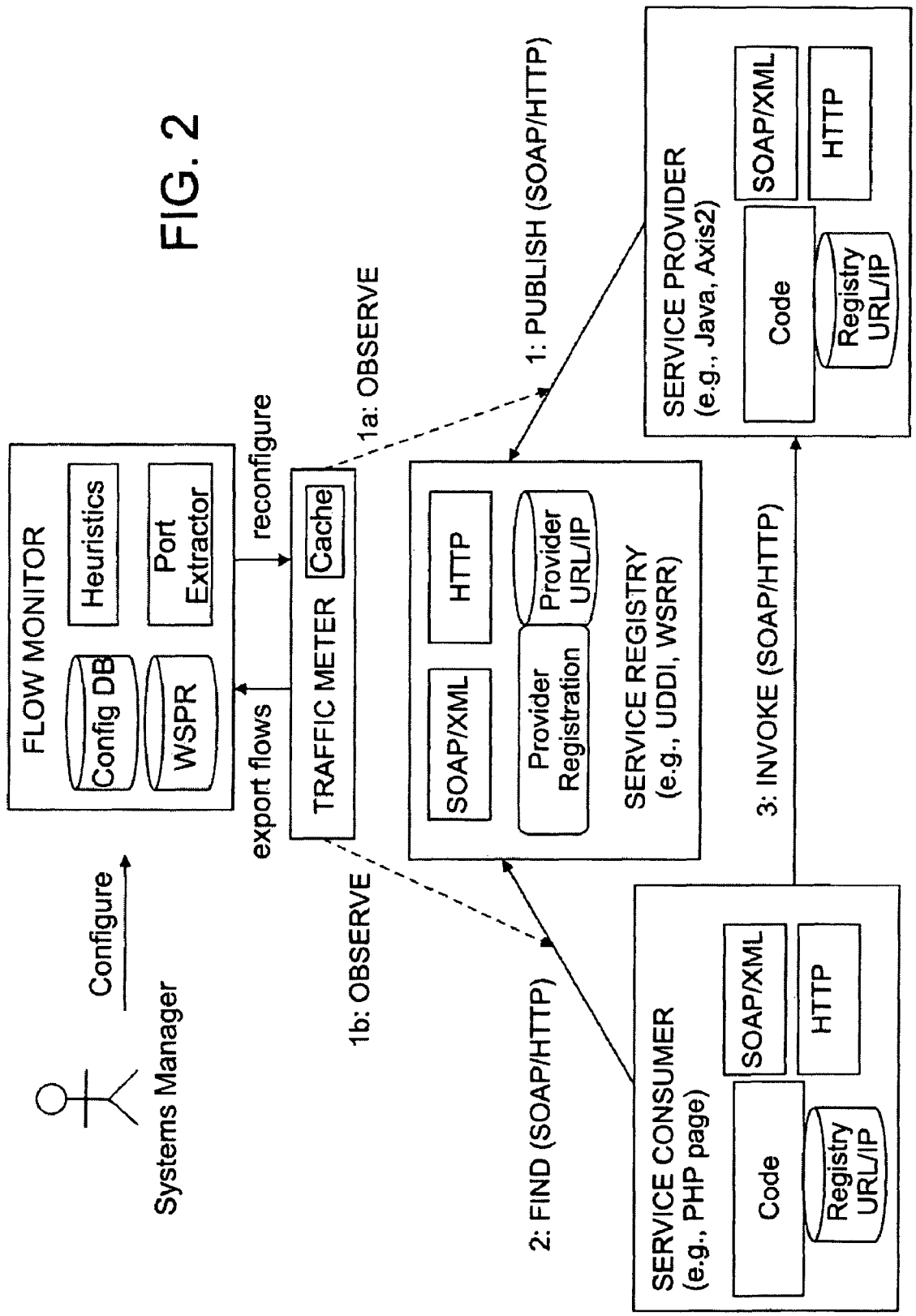
FIG. 2 illustrates a block diagram of a system for extracting port-level information of Web services with flow-based network monitoring in accordance with exemplary embodiments.

FIG. 2 illustrates a block diagram of a system 200 for extracting port-level information of Web services with flow-based network monitoring in accordance with exemplary embodiments. In exemplary embodiments, methods described herein extract transport port level information. Firstly, the monitoring system has to identify the registry machine. The next step is to configure dynamically a traffic meter for analyzing traffic to/from the registry machine. In the third step, several heuristics are applied on exported, traffic flow information with the aim of getting services ports and IP addresses from the traffic flow information.

Considering the first step, the service registry is a service which has a fixed service port. Because the service port is not always known to the monitoring system, the first step is to identify the server hosting the registry. In order to reduce the observed number of candidate. IP addresses, server IP addresses are separated from client IP addresses. In exemplary embodiments, this is achieved with (a combination) of the following heuristics: 1) client-server communication is observed as two unidirectional flows f1=<ip1:p1->ip2:p2, proto> and f2=<ip2:p2->ip1:p1,proto> (with a high probability host ip1 is the server and p1 is the service port when f1 was started before f2); 2) generally, there exists concordance and locality within the characteristics and patterns of the traffic a server machine is involved in (e.g., concentration of requests to a small subset of hosts) (if the mean and deviation of the distributions of specific traffic characteristics is tracked and one IP/port pair shows significantly less deviation values, then this IP is the server machine); 3) exploiting common traffic patterns present during a): service registration (PUBLISH), b): service discovery (FIND), and c): service access (INVOKE) as shown in FIG. 2, the server IP address can be derived with dependency graph techniques (e.g., a typical access to a Web service via UDDI involves two initial SOAP/HTTP flows between the client (Service Consumer) and the broker (Service Registry), which are called find_service and get_serviceDetails. These flows are followed by one or more SOAP/HTTP flows exchanged between the client and the server (Service Provider). To observe other registries such as IBM WebSphere Registry and Repository (WSRR), the traffic patterns look differently, because different data structures are used by each registry API; however, the same processing steps are, required. It is therefore required to configure the traffic monitor per registry type.

Considering the second step, the systems, methods and computer program products described herein configure the metering system (which might be embedded in the routing or switching devices) to export information about the flow to/from the candidate registry IP addresses. The configuration involves: 1) the export of the first n bytes of the payload (including the part which includes port-level information); and 2) export of sub-second traffic flow start and end times (for later temporal correlation analysis).

In considering the third step, the systems, methods and computer program products described herein first analyze the exported n bytes of payload to extract port-level information at the flow monitor, i.e., the HTTP header information and SOAP/XML. For instance, the UDDI data model defines an XML element businessService which contain detailed information about a published service provider, including its access point (typically URL or IP address). It is therefore possible to configure the traffic monitor to scan HTTP responses for the XML tags present in the data structure as illustrated in FIG. 3.

Figure 5:
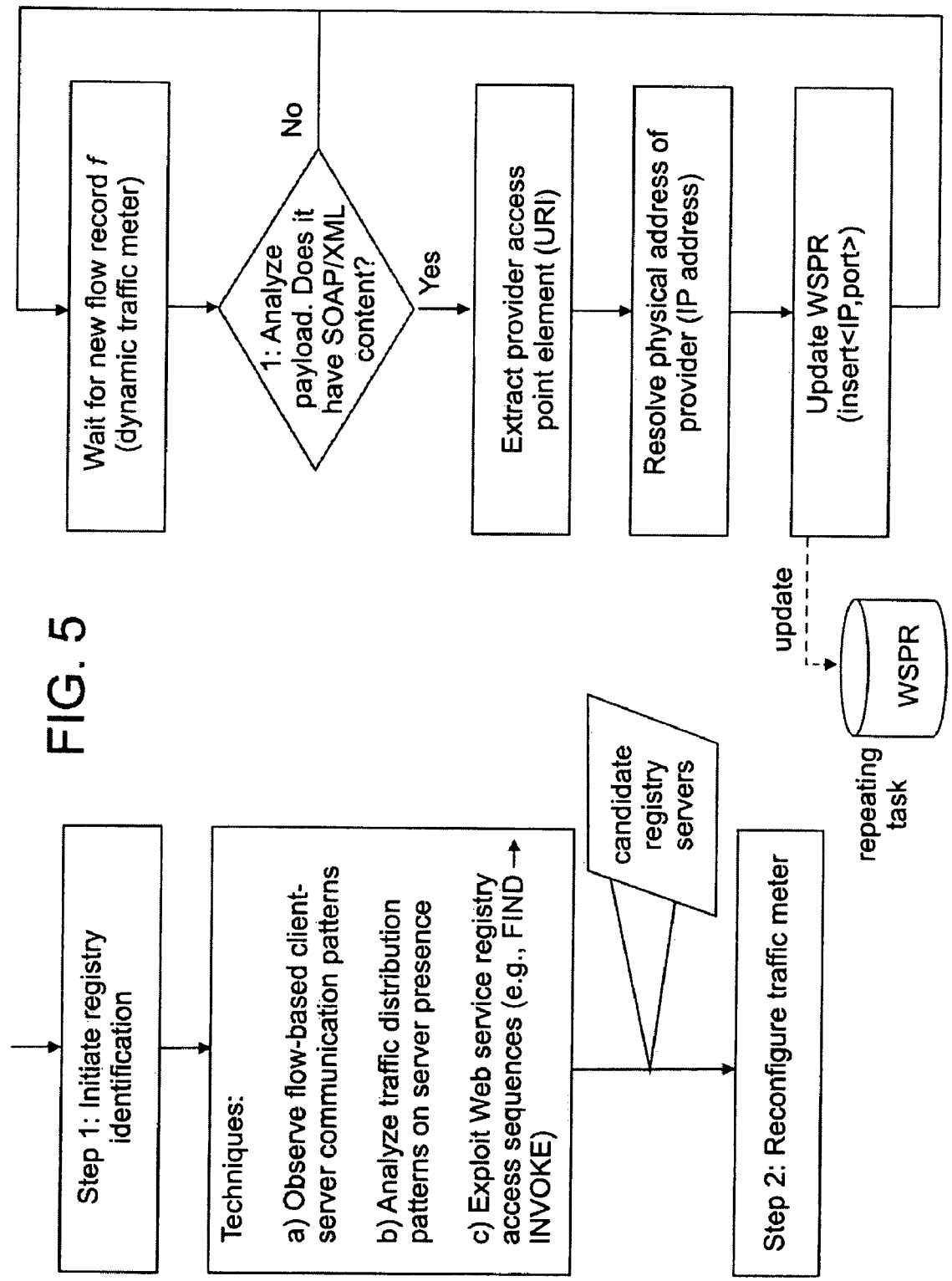
FIG. 5 illustrates a flow chart of an example for a method in accordance with exemplary embodiments.

In exemplary embodiments, according to the UDDI Version 2 specification, the access point element carries the transport layer address of the service provider (here: a URL, as the registration is for a Web service that can be invoked via SOAP/HTTP). The element tModelInstanceInfo can carry additional service categorization information, for example based on an industry domain-specific taxonomy. For example, HTTP request as illustrated in FIG. 4 carries a SOAP request message from a Service Consumer to a UDDI Service Registry. The request format is defined in the UDDI Version 2 API. The presence of a get_serviceDetail and a get_serviceDetail XML tag in the SOAP envelope indicate that the target application must be a UDDI Registry. The relative URI, behind the HTTP POST verb discloses the deployment specific application instance name. The systems methods and computer program products described herein, next extract the value of the access point element and, optionally, the tModelInstanceInfo and the relative URL. Then, the systems methods and computer program products described herein map logical service provider address to physical (IP) if required, e.g., if the value of the access point element is a URI., as in the example shown in FIG. 3. Finally, the systems methods and computer program products described herein insert the service in a Web Service Provider Registry (WSPR). In exemplary embodiments, The Web Service Provider Registry (WSPR) is a database-like component of the traffic monitor that keeps track of the extracted Web service providers and offers querying capabilities. It maintains a list of all observed Web service providers (and associated Web services extracted from the header information). A Web service offered by a provider is detected by the presence of its respective <IP,port> pair in the WSPR, i.e., whenever an <IP,port> pair of a flow is found in the WSPR, it is recognized as Web service traffic. FIG. 5 illustrates a flow chart of an example for a method as described herein.

Figure 6:
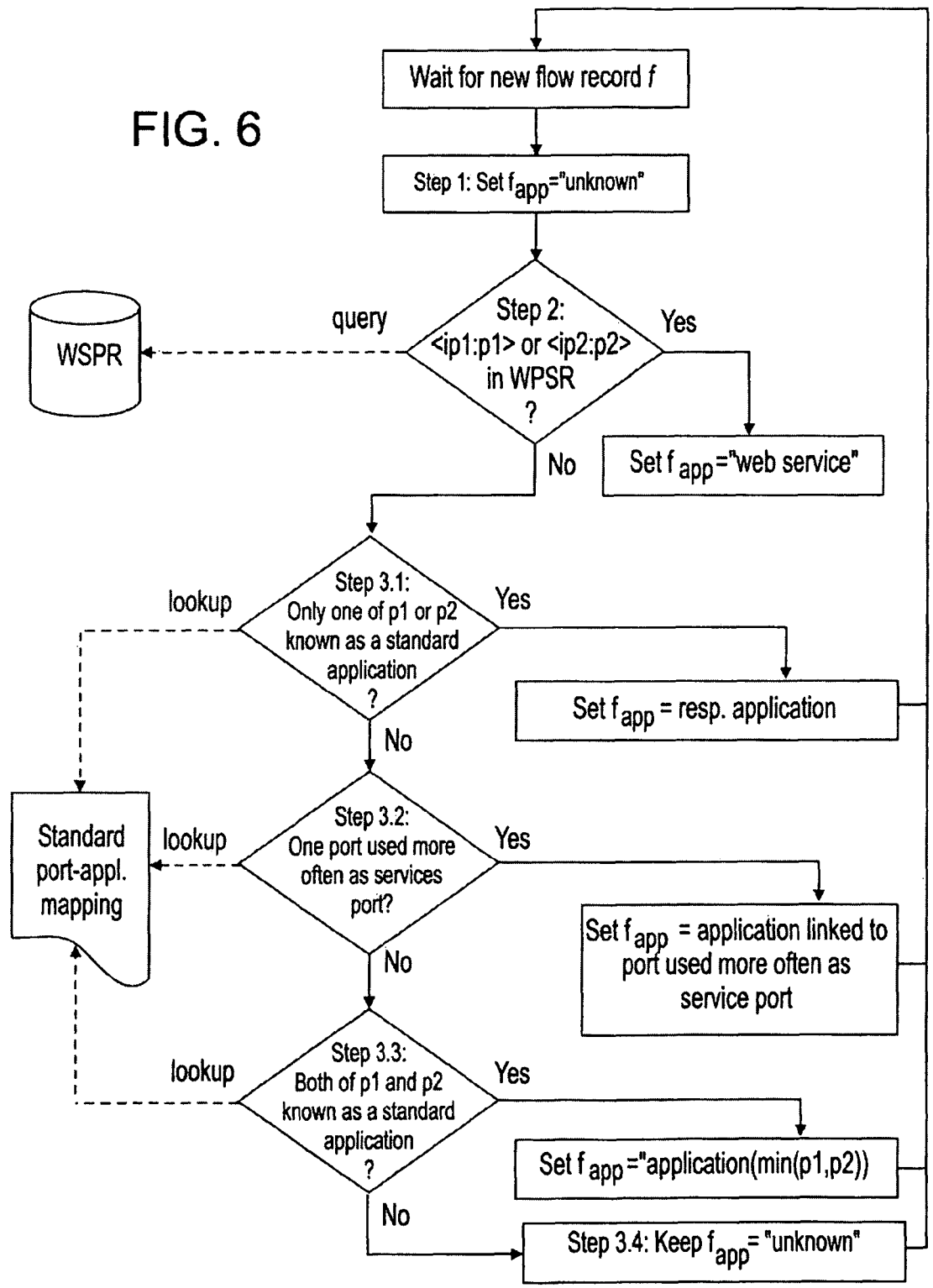
FIG. 6 illustrates a flow chart of a method for classifications of flows in accordance with exemplary embodiments.

In exemplary embodiments, once the WSPR has been populated by <IP,port> mappings (indicating the presence of a Web service application at <IP,port>) the classification of an arbitrary network flow f=<ip1:p1->ip2:p2,proto> regarding its application is performed by three steps: 1) initialization in which the application tag of flow f is set to "unknown application"; 2) assigning a flow to Web service if its properties coincide with an entry in the WSPR (i.e., look-up <ip1:p1> and <ip2:p2> in the WSPR. If one of the <IP,port> pairs {<ip1:p1>, <ip2:p2>} exists in the WSPR, tag flow f (and respective return flows, i.e., f'=<ip2:p2->ip1:p1,proto>) as a "Web service" application; and 3) if the application of f is set to "unknown", assign to f (and respective return flows) a well-known application derived from a standard library of <port, application> mapping. In exemplary embodiments, to derive the corresponding application the following heuristic can be applied: Step 3.1): If exactly one port among p1 and p2 is present in the standard mapping, tag f with the associated application; Step 3.2): If both ports p1 and p2 are described by a standard mapping, tag f with the application of the port being used more often as service port during other occurrences; Step 3.3): If both of the ports p1 and p2 are described by a standard mapping and none of the ports occur significantly often as service port during other occurrences, tag f with the application of the lower port number p=min(p1, p2); and Step 3.4): Leave the tag to "unknown application" otherwise. FIG. 6 illustrates a flow chart of a method for classifications of flows in accordance with exemplary embodiments.

In exemplary embodiments, the systems, methods and computer program products described herein are able to classify Web service traffic as such even if its payload (including headers) is encrypted. This technique is a benefit of the nature of flow-based traffic classification based on destination <IP, port> pairs to define Web service servers in the WSPR. Even though the payload is ciphered, the presence of a previously determined Web service <IP,port> pair in the transport layer headers indicates the application used at the application layer.

In exemplary embodiments, in order to avoid having outdated service provider information in the WSPR, a mechanism can be added to delete service provider information which is older than a given period. The systems, methods and computer program products described herein are also applicable if the Web services registry machine provides the service itself (i.e., no PUBLISH messages) because the FIND messages are nevertheless visible in the observed traffic. Furthermore, the systems, methods and computer program products described herein are also applicable beyond the strict Web services context, for instance in CORBA environments.

In exemplary embodiments, existing flow monitoring systems need to be extended with HTTP header analysis and XML scanning and parsing capabilities (e.g., regular expressions and pattern matching, XPath processing). These capabilities are required to extract the access point information from the exported flow records. The service provider extraction heuristics (step 3) need to be configured with payload content patterns for registration (PUBLISH) and lookup (FIND) requests to common registry types such as UDDI and WSRR, as shown in example. Additionally, automatic router reconfiguration needs to be enabled in the flow monitor to reconfigure the traffic meter dynamically. A mapping table of Web service providers, the Web Service Provider Registry (WSPR), needs to be located at the flow monitor.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system, a method for extracting port-level information of Web services with flow-based network monitoring, the method comprising:
    identifying a registry machine;
    coupling the registry machine to a traffic meter and flow monitor;
    dynamically configuring the traffic meter, including:
        exporting a first n bytes of a traffic payload;
        exporting a sub-second traffic flow start and end times;
    extracting service provider information from traffic flow exports, including:
        analyzing the exported n bytes of the traffic payload to extract port-level information at the flow monitor;
        extracting a value of an access point element;
        mapping a logical service provider address to a physical address;
        inserting the service into a Web Service Provider Registry within the flow monitor, thereby populating the Web Service Provider Registry, wherein the Web Service Provider Registry is populated by <IP,port> mappings, thereby indicating presence of a Web service application at <IP,port>; and
    classifying an arbitrary network flow in the form of f=<ip1:p1->ip2:p2,proto> regarding its application, including:
    initializing registry identification, in which an application tag of f is set to "unknown application";
    assigning the traffic flow a Web service in response to properties of the traffic flow coinciding with an entry in the Web Service Provider Registry;
    assigning return flows an application derived from a standard library of <port, application> mapping;
    assigning return flows an application derived from heuristics considering if a port is used multiple times also in other flows;
    in response to a <IP,port> pair, {<ip1:p1>, <ip2:p2>} existing in the Web Service Provider Registry, setting f as a Web Service Application;
    in response to f set to "unknown", assigning f to a well-known application derived from a standard library of <port, application> mapping;
    in response to exactly one port among p1 and p2 being present in the standard mapping, tagging f with an associated application;

in response to both ports p1 and p2 being described by a standard mapping, tagging f with the application of the port being used more often as service port during other occurrences; and in response to both of the ports p1 and p2 being described by a standard mapping and none of the ports occurring significantly often as a service port during other occurrences, tagging f with the application of the lower port number p=min(p1, p2).

* * * * *